United States Patent Office 3,819,618
Patented June 25, 1974

3,819,618
THIAZOLO[3,4-a]BENZIMIDAZOLES
Rudiger Dieter Haugwitz, Titusville, and Venkatachala Lakshmi Narayanan, Hightstown, N.J., assignors to E. R. Squibb & Sons, Inc., Princeton, N.J.
No Drawing. Filed Oct. 2, 1972, Ser. No. 294,125
Int. Cl. A61k 27/00; C07d 91/24
U.S. Cl. 260—240 F
7 Claims

ABSTRACT OF THE DISCLOSURE

Disclosed are 3 - substituted - 1-imino-1H,3H-thiazolo-[3,4-a]benzimidazoles, 3 - substituted-1H,3H - thiazolo-[3,4-a]-benzimidazole-1-ones and derivatives thereof. In addition, methods for preparing said compounds, compositions containing said compounds and methods for the use of said compositions as anthelmintics are taught.

Worm infestations of animals have been an ever present problem to the live stock industry. Over the years, a considerable research effort has given rise to numerous agents for the treatment of many of these worm infestations. However, researchers in the area of veterinary medicine are constantly seeking new agents having broader ranges of activity, lower toxicities, lower residues remaining in the animals and lower costs in their preparation.

This invention relates to new anthelmintic compounds of the structure:

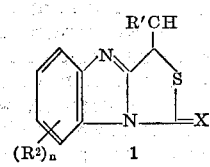

wherein $R^1$ is phenyl, substituted phenyl, naphthyl or hetero-aromatic 5- or 6-membered ring system; $R^2$ is hydrogen, halo, nitro, lower alkyl, lower alkoxy, amino, di-lower alkylamino-lower alkyl or phenyl; X is $NCONHR^3$ or oxygen; $R^3$ is lower alkyl, phenyl, substituted phenyl, naphthyl, phenyl lower alkyl or trichloromethylcarbonyl and $n$ is 1 or 2.

In addition, this invention relates to methods for preparing said compounds, compositions containing said compounds and methods for treating helminthiasis utilizing said compositions.

In this invention, the term "lower alkyl" is intended to mean a straight or branched hydrocarbon fragment of from 1 to 8 carbon atoms.

The term "substituted" as in "substituted phenyl" is intended to mean a substituent selected from the group consisting of lower alkyl, lower alkoxy, nitro, halogen (fluorine, chlorine, bromine and iodine), carboxy, carbolower alkoxy and tifluoromethyl.

The term "heteroaromatic 5- or 6-membered ring" and "5-membered heteroaromatic and 6-membered heteroaromatic" is intended to include the following ring systems: furan, thiophene, imidazole, oxazole, thiazole, pyrrole, tetrazole, pyridine, pyrimidine, triazines, oxadiazoles.

In addition, this term is to include systems where the heteroaromatic ring is part of a larger heterocyclic ring system, such as indole, benzimidazole, benzothiazole, quinoline, isoquinoline, benzofuran, benzothiophene, etc. It is also intended that linkage of the $R^1$ group to the carbon atom may be at any one of the available positions on the heterocyclic ring.

The compounds of this invention (I) may be prepared by the following reactions:

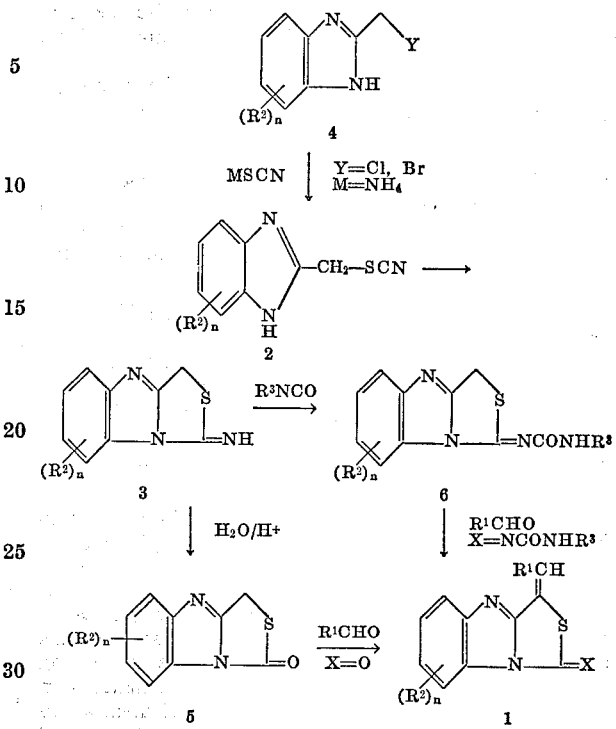

The preparation of the necessary starting materials is disclosed in U.S. Pats. 3,678,066 and 3,665,007 and U.S. Application Ser. No. 108,600 (filed Jan. 21, 1972) now U.S. Pat. No. 3,732,240 which are incorporated by reference.

The cyclization of compounds of the type 2 into those of type 3 may be readily achieved by refluxing the thiocyanic acid, 2-benzimidazoyl methyl ester (2) (U.S. Pat. 3,678,066) in a solvent such as methanol (U.S. Pat. 3,665,-007).

The reaction of a halobenzimidazole (4) with the compound MSCN to directly give a 1-imino-1H,3H-thiazolo [3,4-a]benzimidazole (3) may also be readily prepared by refluxing in a solvent, such as methanol (U.S. Pat. 3,665,007).

The reaction of 3 with an isocyanate may be carried out in refluxing ethyl acetate (U.S. Application Ser. No. 108,600, filed Jan. 21, 1972, now U.S. Pat. No. 3,732,-240, while the hydrolysis of compounds of the type 3 to a 1H,3H-thiazolo[3,4-a]benzimidazole - 3 - one (5) is achieved by the use of hot concentrated hydrochloric acid (U.S. Pat. No. 3,665,007).

Compounds of the formulae 5 and 6 are converted to the compounds of this invention (1) by reaction with an aldehyde. This condensation may be brought about by heating compounds of the type 5 or 6 in the absence of a solvent wherein an excess of the aldehyde serves as the solvent, or in a variety of protic (ethanol, 3-methylbutanol, etc.) or aprotic solvents (nitrobenzene, dimethylsulfoxide, dimethyl formamide, etc.). The temperature range is from about 80° to about 200° C. for periods of from about 5 minutes to about 24 hours.

The introduction of $R^1CH=$ moiety gives rise to one of the following isomers:

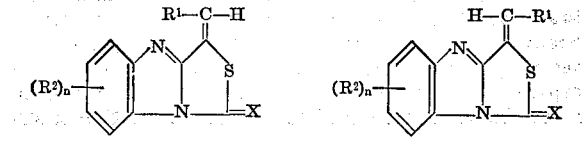

or most probably a mixture thereof. The similarity of behavior of such isomers makes absolute determination difficult. However, this invention is directed to all of the possible isomeric products.

Due to the nature of the ring closures to form compounds of the type 3, it is to be understood that when $R^2$ is stated as a 5-substituent, it may in fact be a 6-substituent or a mixture thereof. The same applies for 4 and 7 substitution.

Of the above disclosed compounds of this invention, the preferred compounds are those wherein X=O or

where $R^3$=phenyl or lower alkyl or trichloromethyl; $R^1$ is heteroaromatic 5-membered ring having one hetero atom which is either oxygen, sulfur or nitrogen and phenyl; $R^2$ is methoxy, chloro; the most preferred being the following compounds:

3-(2-thenylidene)-1H,3H-thiazolo[3,4-a]benzimidazol-1-one,
1-(3-benzylidene-1H,3H-thiazolo[3,4-a]benzimidazol-1-ylidene)-3-phenylurea,
1-phenyl-3-[3-(2-thenylidene)-1H,3H-thiazolo[3,4-a]benzimidazol-1-ylidene]urea,
1-(3-furfurylidene-1H,3H-thiazolo[3,4-a]benzimidazol-1-ylidene)-3-phenylurea.

The 3-substituted-1-amino-1H,3H-thiazolo[3,4-a]benzimidazoles and 3-substituted-1H,3H-thiazolo[3,4-a]benzimidazole-1-ones described herein have anthelmintic activity and are useful in the treatment and/or prevention of helminthiasis, a parasitic disease which causes widespread and often serious infection in domesticated animals such as swine, horses, cattle, sheep and goats. In treating domesticated animals, the compounds may be mixed with a nontoxic, edible carrier to form a feed supplement which is then incorporated in the animal feed in the desired concentration, or they may be adimnistered in unit dosage forms which, in the case of large domesticated animals, take the form of boluses, or in the form of a liquid drench. Alternatively, a dispersible, wettable powder containing the anthelmintic agent may be added to the drinking water of the animals.

The preferred dosage level for treating a helminth infection will depend to a large extent on the particular 1H,3H-thiazolo[3,4-a]benzimidazole being employed, on the severity of the infection and on the particular species of animal to be treated. In general, the compounds of this invention exhibit anthelmintic activity when administered to animals in a daily dose of about 5 to about 200 mg. per kilogram of animal body weight. It is preferred to employ in the range of 25–60 mg. per kilogram of body weight per day. The compounds may be given in a single dose or divided into a plurality of smaller doses. If desired, the course of treatment may be extended over a period of days in which case the optimum daily dose level may be lowered. When the compounds are to be employed primarily as prophylactic agents for the prevention of helminthic infections, the preferred daily dose level is, of course, lower than the therapeutic level is, preferably in the range of about 10 mg. per kilogram of body weight. The 1H,3H-thiazolo[3,4-a]benzimidazoles may be incorporated in the animal feeds, and this method of administration is preferred when the compounds are to be used prophylactically, in which case they are incorporated in the feeds at concentrations of active substance between 0.01 and 1%.

The means employed for administering the compounds of this invention to animals are not critical, and any of the methods now used or available for treating animals infected with or susceptible to parasitic infections are satisfactory. When these substances are employed therapeutically to treat an established infection, they are conveniently administered in a unit dosage form such as in a capsule, bolus, tablet, or as a liquid drench. It will be noted that all of these methods contemplate oral administration, since this is the most effective method of treating the worm-infested stomach or intestinal tract.

When these anthelmintic substances are to be administered in unit dosage form, capsules, boluses or drenches containing the desired amount of anthelmintic distributed in a pharmaceutically acceptable vehicle are usually employed. These are prepared by intimately and uniformly mixing the active ingredient with suitable finely divided diluents, suspending agents, fillers, disintegrating agents and/or binders such as starch, lactose, talc, magnesium stearate, vegetable gums and the like. These unit dosage formulations may be widely varied with respect to their total weight and content of anthelmintic agent, depending on factors such as the type of host animal to be treated, the dose level desired, and the severity and type of parasitic infestation. For large animals such as sheep, swine or cattle, boluses weighing up to 15 grams may be used, although it is preferred to employ boluses weighing from 2–10 grams and containing from 1–5 grams of the anthelmintic agent. These boluses, as well as smaller size tablets, contain binders and lubricants, and are compounded by techniques known in this art. Capsules are readily prepared by mixing the active ingredient with a diluent such as starch or lactose and filling into the capsule.

In order to treat infected animals by means of a drench, the compounds are mixed with a suspending agent such as bentonite and the solid product added to water just prior to administration. The preferred drenches in accordance with this invention contain from about 5–50% by weight of active ingredient.

The compounds described herein may also be administered as a component of the feed of the animals or dissolved or suspended in the drinking water. According to the invention, novel feed and feed supplement compositions are provided in which the compounds of this invention are present as an active anthelmintic ingredient. Such compositions comprise the compounds of this invention intimately dispersed in or admixed with an inert carrier or diluent, i.e., one that is nonreactive with respect to the active ingredient and that may be administered with safety to the animals. The carrier or diluent is preferably one that is or may be an ingredient of the animal ration.

In the feed supplement compositions the active ingredient is present in relatively large amounts. These supplements are suitable for addition to the feed either directly or after an intermediate dilution or blending step. Examples of carriers or diluents suitable for such compositions are solid orally ingestible carriers such as distillers' dried grains, corn meal, citrus meal, fermentation residues, ground oyster shells, Attapulgus clay, wheat shorts, molasses solubles, corn cob meal, edible, vegetable substances, toasted dehulled soya flour, soybean mill feed, antibiotic mycelia, soya grits, crushed limestone and the like. The anthelmintic agents are intimately dispersed or admixed throughout the solid inert carrier by methods such as grinding, stirring, milling, or tumbling. By selecting proper diluents and by altering the ratio of carrier to active ingredient, compositions of any desired concenration may be prepared. Formulations containing from about 5% to about 50% by weight, and preferably from about 10–30% by weight, of active ingredient are particularly suitable for addition to feeds. The active compound is normally dispersed or mixed uniformly in the diluent but in some instances may be sorbed on the carrier.

Feed supplements are prepared by uniformly mixing the appropriate compound of this invention with the carrier or carriers. Such supplements are added to the finished animal feed in an amount adequate to give the final concentration desired for controlling or treating helminthiasis by way of the animal ration. Although the preferred level in feeds will depend on the particular compound being employed, the anthelmintic compounds of this invention are normally fed at levels of 0.10–2.0% in the feed. One advantageous method of administering the compounds of this invention to animals whose feeds are conveniently pelleted, such as sheep, is to incorporate them directly in the pellets. For instance, a 1H,3H-thiazolo[3,4-a]benzimidazole is readily incorporated in nutritionally adequate alfalfa pellets (during the pelleting operation) at levels of 0.5 to 5 grams per pound of pellets for therapeutic use, and at lower levels for prophylactic use, and such pellets fed to the worm-infested animals. Alternatively, the compounds may be incorporated in salt licks or salt blocks at any desired concentration (concentrations of 5–25% by weight are conveniently employed). Large animals such as sheep, cattle and goats, then receive the anthelmintics with their salt.

The following examples further illustrate the invention.

EXAMPLE 1

Thiocyanic acid, 2-benzimidazolyl methyl ester

A solution of 8.4 g. of ammonium thiocyanate in 68 ml. of dimethylsulfoxide is treated with 9 g. of 2-chloromethylbenzimidazole and the clear solution is stirred for about 15 hours at about ambient temperature, adding water until no further precipitate formed at the end of this time. The solid is filtered, washed with water, dissolved in dimethylsulfoxide and reprecipitated with water. This reprecipitating process is repeated. Upon drying at 25° C. under a vacumm of 0.01 mm./Hg 4.2 g. of analytically pure ester is obtained, m.p. 153–154°.

*Anal.*—Calcd for $C_9H_7N_3S$: C, 57.20; H, 3.73; N, 22.23. Found: C, 57.10; H, 3.86; N, 21.96.

EXAMPLE 2

1-Imino-1H,3H-thiazolo[3,4-a]benzimidazole

A solution of 4.2 g. of thiocyanic acid, 2-benzimidazoyl methyl ester in 200 ml. of methanol is refluxed for one hour; cooling and water addition, until complete precipitation is achieved furnishes 2 g. of 1-imino-1H,3H-thiazolo[3,4-a]benzimidazole.

*Anal.*—Calcd for $C_9H_7N_3S$: C, 57.12; H, 3.73; N, 22.20. Found: C, 57.23; H, 3.96; N, 22.20.

EXAMPLE 3

Thiocyanic acid, (5-chloro-2-benzimidazoyl)methyl ester

To a solution of 25 g. of ammonium thiocyanate in 125 ml. of dimethylsulfoxide at 0° C., there is added 9.8 g. of 5-chloro-2-chloromethyl benzimidazole. The solution is kept at 0° for about six hours after which water is added until no further precipitate is formed. After filtration the solid is dried and recrystallized from chloroform-petroleum ether (b.p. 30–60°) yield: 4.0 g.; m.p. 125–128°.

*Anal.*—Calc'd for $C_9H_6ClN_3S$: C, 48.33; H, 2.70; N, 18.79. Found: C, 48.28; H, 2.98; N, 18.50.

EXAMPLE 4

Thiocyanic acid, (1-methyl-2-benzimidazoyl)methyl ester

A solution of 13.3 g. of ammonium thiocyanate and 8 g. of 1-methyl-2-chloromethyl benzimidazole in 60 ml. of dimethylsulfoxide is stirred at room temperature for 22 hours, after which water is added to precipitate the product. Recrystallization of the dried solid from chloroform-ethyl ether furnished 5.4 g. of analytically pure product, m.p. 136–138°.

*Anal.*—Calc'd for $C_{10}H_9N_3S$: C, 59.09; H, 4.47; N, 20.67. Found: C, 58.80; H, 4.53; N, 20.36.

EXAMPLE 5

Thiocyanic acid, (5,6-dimethyl-2-benzimidazoyl) methyl ester

Utilizing the procedure of Example 1 but substituting 5,6 - dimethyl - 2 - bromomethylbenzimidazole for 2-chloromethylbenzimidazole, the product recovered is thiocyanic acid (5,6-dimethyl-2-benzimidazoyl)methyl ester.

EXAMPLE 6

Thiocyanic acid, (2-benzimidazoyl-α-methyl)methyl ester

Utilizing the procedure of Example 1 but substituting α - methyl - 2 - chloromethylbenzimidazole for 2-chloromethylbenzimidazole the product recovered is thiocyanic acid (2-benzimidazoyl-α-methyl)methyl ester.

EXAMPLE 7

Thiocyanic acid-(6-phenyl-5-nitro-2-benzimidazoyl)-α-propyl methyl ester

Utilizing the procedure of Example 1 but substituting 6 - phenyl - 5 - nitro-α-propyl-2-chloromethylbenzimidazole for 2-chloromethylbenzimidazole, the product recovered is thiocyanic acid-(6-phenyl-5-nitro-2-benzimidazoyl)-α-propyl methyl ester.

EXAMPLE 8

Thiocyanic acid-(6-o-chlorophenyl-5-methoxy-2-benzimidazoyl)methyl ester

Utilizing the procedure of Example 1 but substituting 6 - o - chlorophenyl - 5 - methoxy - 2 - chloromethylbenzimidazole, the product recovered is thiocyanic acid-(6 - o - chlorophenyl - 5 - methoxy-2-benzimidazoyl-α-chlorophenyl)methyl ester.

EXAMPLE 9

Thiocyanic acid, (5-nitro-2-benzimidazoyl)methyl ester

To a solution of 3.5 g. of ammonium thiocyanate in 30 ml. of dimethylsulfoxide, there is added 3.8 g. of 2-chloromethyl-5-nitrobenzimidazole. The solution is kept at room temperature overnight, after which water is added to precipitate the product. Two crystallizations from methanol-petroleum ether (b.p. 30–60° furnished 2.8 g. of pure product, m.p. 167–69°

*Anal.*—Calc'd for $C_9H_6N_4O_2S$: C, 46.15; H, 2.58; N, 23.92. Found: C, 46.09; H, 2.63; N, 23.74.

EXAMPLE 10

Substituted-1-imino-1H,3H-thiazolo[3,4-a]benzimidazoles

Upon refluxing a methanolic solution of a thiocyanic acid prepared according to Examples 3 to 9 in the manner described in Example 2, one obtains the respective 1-imino-1H,3H-thiazolo[3,4-a]benzimidazole.

EXAMPLE 11

1-Imino-1H,3H-thiazolo[3,4-a]benzimidazole

A mixture of 34 g. of 2-chloromethyl-benzimidazole and 60 g. of ammonium thiocyanate in 1,000 ml. of methanol, is refluxed for 1 hour. The solution is evaporated to about half its volume and then chilled.

The product separates and is filtered off. Recrystallization from methanol yields 8.3 g. of pure product, m.p. 169–170°.

*Anal.*—Calcd. for $C_9H_7N_3S$: C, 57.12; H, 3.73; N, 22.20. Found: C, 57.23; H, 3.96; N, 22.20.

EXAMPLE 12

6 and 7-Chloro-1-imino-1H,3H-thiazolo[3,4-a] benzimidazole

A mixture of 10 g. of 2-chloromethyl-5-chlorobenzimidazole and 8 g. of ammonium thiocyanate is dissolved in 200 ml. of dimethyl formamide and heated for 3.5 hours at 50°. Water is added until no further precipitate is formed. This mixture is allowed to stand overnight at room temperature; then the formed precipitate is crystallized twice from ethyl ether to yield 6 g. of pure product, m.p. 156–158°.

Anal.—Calcd. for $C_9H_6ClN_3S$: C, 48.33; H, 2.70; N, 18.78. Found: C, 48.55; H, 2.96; N, 18.70.

EXAMPLE 13

1-Imino-6,7-dimethyl-1H,3H-thiazolo[3,4-a]benzimidazole

Utilizing the procedure of Example 1, but substituting 5,6-dimethyl-2-chloromethyl-benzimidazole for 2-chloromethylbenzimidazole, the product recovered is 1-imino-6,7-dimethyl-1H,3H-thiazole[3,4-a]benzimidazole.

EXAMPLES 14–17

Following the procedure of Example 1, but utilizing the compounds illustrated in Column A of Table I in lieu of 2-chloromethyl-benzimidazole and ammonium thiocyanate, the product formed has the structure of Column B:

cyanate and 50 ml. of ethyl acetate is refluxed for 1 hour. The solvent is evaporated and the residue crystallized twice from benzene to yield 4 g. of product, M.P. 160° (melts, solidifies, melts again at 195–197°).

Anal.—Calcd. for $C_{16}H_{12}N_4OS$: C, 62.32; H, 3.92; N, 18.17. Found: C, 62.20; H, 4.09; N, 17.98.

EXAMPLE 21

1-(p-nitrophenyl)-3-(1H,3H-thiazolo[3,4-a]benzimidazol-1

To a solution of 2.7 g. of 1-imino-1H,3H-thiazolo[3,4-a]benzimidazole as prepared in Example 1 in 250 ml. of ethyl acetate there is added 5 g. of p-nitrophenylisocyanate dissolved in 10 ml. of ethyl acetate. After refluxing the mixture for 30 minutes the flask content is cooled and the product filtered off. Crystallization from pyridine furnishes 2.5 g., M.P. 260–262°.

TABLE I

| | A<br>Starting materials | | | B<br>Product |
|---|---|---|---|---|
| | 4 | MSCN | | 3 |
| Example No. | R² | Y | M⁺ | R² |
| 14 | 5,6-di-Cl | Cl | Na | 6,7-di-Cl |
| 15 | (5,6-ring) | Cl | Na | (6,7-ring) |
| 16 | (4,5-ring) | Cl | NH₄+ | (5,6-ring) |
| 17 | 5-NO₂ | Br | Li | 6 and 7 NO₂ |

EXAMPLE 18

1H,3H-Thiazolo[3,4-a]benzimidazole-1-one

To 195 ml. of hot concentrated hydrochloric acid (90°), there is added 7.8 g. of 1-imino-1H,3H-thiazole[3,4-a]-benzimidazole. This mixture is stirred on a steam bath for 10 minutes. Then, the resulting solution is cooled and brought to pH 5 with concentrated ammonia. The formed precipitate is filtered and crystallized twice from ethyl acetate to yield 2.8 g. pure product, M.P. 212–214°.

Anal.—Calcd. for $C_9H_6N_2OS$: C, 56.85; H, 3.18; N, 14.73. Found: C, 56.99; H, 3.34; N, 14.94.

EXAMPLE 19

Substituted -1H,3H-thiazole[3,4-a]benzimidazole-1-one

According to the procedure of Example 18 wherein the compounds of Examples 2 and 10–17 are substituted in place of the 1-imino-1H,3H-thiazolo[3,4-a]benzimidazole, the corresponding 1H,3H-thiazole[3,4-a]benzimidazole-1-one is obtained.

EXAMPLE 20

1-Phenyl-3-[1H,3H-thiazole[3,4-a]benzimidazol-1-ylidene]urea

A mixture of 5.7 g. 1-imino-1H,3H-thiazolo[3,4-a]-benzimidazole as prepared above, 10 ml. of phenyl iso- Anal.—Calcd. for $C_{16}H_{11}N_5O_3S$: C, 54.38; H, 3.14; N, 19.82. Found: C, 54.60; H, 3.32; N, 19.83.

EXAMPLE 22

1-(1H,3H-thiazolo[3,4-a]benzimidazole-1-ylidene)-3-(trichloroacetyl)urea

A solution of 4.8 g. of 1-imino-1H,3H-thiazolo[3,4-a]-benzimidazole in 500 ml. of ethyl acetate is warmed to 50°. With stirring there is added a solution of 5 g. of trichloroacetylisocyanate in 100 ml. of ethyl acetate. This mixture is stirred for 30 minutes and the solid is filtered off. Upon dissolving the product in a minimum of dimethylsulfoxide the product is precipitated with water to yield 3 g., M.P. 180–182°.

Anal.—Calcd. for $C_{12}H_7Cl_3N_4O_2S$: C, 38.17; H, 1.88; N, 14.84. Found: C, 37.99; H, 1.89; N, 15.06.

EXAMPLES 23–32

Following the procedure of Examples 1 to 3, substituting the 1-imino-1H,3H-thiazolo[3,4-a]benzimidazole shown in column 1 of Table I below and the isocyanate shown in column 2, the product shown in column 3 is obtained.

TABLE I

| Example number | R² | n | R³ | R² | n | NHR³ |
|---|---|---|---|---|---|---|
| 23 | | 0 | CH₃ | | 0 | —NHCH₃ |
| 24 | | 0 | CH₂C₆H₅ | | 0 | —NHCH₂C₆H₅ |
| 25 | {6-CH₃, 7-CH₃} | 2 | —C₆H₄—Cl | {6-CH₃, 7-CH₃} | 2 | —NH—C₆H₄—Cl |
| 26 | | 1 | C₆H₅ | | 1 | —NHC₆H₅ |
| 27 | 6-F | 1 | C₂H₅ | 6-F | 1 | —NHC₂H₅ |
| 28 | 5-CH₃O | 1 | C₃H₇ | 5-CH₃O | 1 | —NHC₃H₇ |
| 29 | 6-CH₃NH— | 1 | —C₆H₄—CH₃ | 6-CH₃NH— | 1 | —NH—C₆H₄—CH₃ |
| 30 | 7-C₆H₅NH— | 1 | C(=O)—C₆H₅ | 7-C₆H₅NH— | 1 | —NH—C(=O)—C₆H₅ |
| 31 | | 1 | C₄H₉ | | | —NHC₄H₉ |
| 32 | {5-I, 6-CH₃} | 2 | C₅H₁₁ | {5-I, 6-CH₃} | 2 | —NHC₅H₁₁ |

EXAMPLE 33

3-(2-Thenylidene)-1H,3H-thiazolo[3,4-a]-benzimidazol-1-one 2 g. of 1H,3H-Thiazolo[3,4-a]benzimidazol-1-one and 5 ml. of 2-thiophene-carboxaldehyde was refluxed for 5 minutes. The mixture was cooled and methanol was added. The resulting solid was filtered off and crystallized from chloroform to yield 1.0 g. of product M.P. 211–212°.

EXAMPLE 34

3-(3-Thienylidene)-1H,3H-thiazolo[3,4-a]benzimidazol-1-ones

According to the procedure of Example 33, if one substitutes in place of 1H,3H-thiazolo[3,4-a]benzimidazol-1-one, the compounds of Example 19, one obtains the corresponding 3-(2-thienylidene) compound.

EXAMPLES 35–38

3-(3-Substituted)-1H,3H-thiazolo[3,4-a]benzimidazol-1-ones

According to the procedure of Example 33, if one substitutes in place of the 2-thiophenecarboxaldehyde, a compound of the following group:

2-trifluoromethylbenzaldehyde,
2-nitrobenzaldehyde,
4-methylbenzaldehyde, and
pyridine-2-carboxaldehyde, one obtains:

3-(2-trifluoromethylbenzylidene)-1H,3H-thiazolo[3,4-a]-benzimidazol-1-one,
3-(2-nitrobenzylidene)-1H,3H-thiazolo[3,4-a]benzimidazol-1-one, and
3-(4-methylbenzylidene)-1H,3H-thiazole[3,4-a]benzimidazol]-1-one, and
3-(2-pyridylidene)-1H,3H-thiazolo[3,4-a]benzimidazol-1-one.

EXAMPLE 39

1-(3-Benzylidene-1H,3H-thiazolo[3,4-a]benzimidazol-1-ylidene)-2-phenylurea

A mixture of 2.0 g. (0.067 mole) of 1-(1H,3H-thiazolo-[3,4-a]benzimidazol-1-ylidene) - 3 - phenylurea and 1.5 ml. of benzaldehyde was refluxed for 3 minutes. The reaction mixture was cooled and MeOH was added. The resulting yellow solid was crystallized from CHCl₃—Et₂O to yield 1.0 g., m.p. 221–224°.

*Anal.*—Calcd. for C₂₃H₁₆N₄O₅: C, 69.66; H, 4.07; N, 14.13. Found: C, 69.89; H, 4.36; N, 14.32.

EXAMPLE 40

1-Phenyl-3-[3-(2-thenylidene)-1H,3H-thiazolo-[3,4-a]benzimidazol-1-ylidene]urea

A mixture of 1.5 g. (0.005 mole) of 1-(1H,3H-thiazolo-[3,4-a]benzimidazol-1-ylidene) - 3 - phenylurea and 1.5 ml. of 2-thiophenecarboxaldehyde was refluxed for 3 minutes. The reaction mixture was cooled and MeOH was added. The resulting yellow solid was filtered off and crystallized from Et₂O to yield 0.85 g., m.p. 256–258° C.

*Anal.*—Calcd. for C₂₁H₁₄N₄OS₂: C, 62.66; H, 3.51; N, 12.92. Found: C, 62.58; H, 3.76; N, 14.21.

EXAMPLE 41

1-(3-Furfurylidene-1H,3H-thiazolo[3,4-a]benzimidazol-1-ylidene)-3-phenylurea 2.7 g. (0.0088 mole) 1(1H,3H-thiazolo[3,4-a]benzimidazol-1-ylidene)-3-phenylurea was refluxed in 5 ml. of furfural for 3 minutes. The mixture was cooled and MeOH was added. The resulting yellow solid was filtered off and crystallized to yield 1.1 g., m.p. 230–234°.

*Anal.*—Calcd. for C₂₁H₁₄N₄O₂S: C, 65.28; H, 3.66; N, 14.58. Found: C, 65.17; H, 3.88; N, 14.39.

EXAMPLE 42

1-(3-Benzylidene-1H,3H-thiazolo[3,4-a]benzimidazol-1-ylidene)-3-nitrophenylurea

According to Example 39 if one substitutes in place of the 1-(1H,3H-thiazolo[3,4-a]benzimidazol-1-ylidene)-3-phenylurea, the 1-(p-nitrophenyl) - 3 - (1H,3H-thiazolo[3,4-a]benzimidazol - 1 - ylidene)urea of Example 21, one obtains the 1-(3-benzylidene-1H,3H-thiazolo[3,4-a]benzimidazol-1-ylidene)-3-nitrophenylurea.

EXAMPLE 43

1-(3-Benzylidene-1H,3H-thiazolo[3,4-a]benzimidazol-1-ylidene)-3-trichloroacetylurea According to Example 39 if one substitutes in place of 1-(1H,3H-thiazolo[3,4-a]benzimidazol - 1 - ylidene)-3- phenylurea, the 1-(1H,3H-thiazolo[3,4-a]benzimidazol-1-ylidine)-3-trichloroacetylurea of Example 22, one obtains the 1-(3-benzylidene - 1H,3H - thiazolo[3,4-a]benzimidazol-1-ylidene)-3-trichloroacetylurea.

EXAMPLE 44

1-(3-Benzylidene-1H,3H-thiazolo[3,4-a]benzimidazol-1-ylidene)ureas

According to Example 39 if one substitutes in place of -(1H,3H - thiazolo[3,4-a]benzimidazol - 1 - ylidene)-3-phenylurea, the compounds of Examples 23–32, one obtains the corresponding 3-benzylidene ureas.

EXAMPLES 45–55

1-(3-substituted-1H,3H-thiazolo[3,4-a]benzimidazol-1-ylidene)-3-phenylureas

According to Example 39, if one substitutes in place of the benzaldehyde, a compound of the following group:

thiophene-3-carboxaldehyde,
pyridine-2-carboxaldehyde,
2-methoxybenzaldehyde,
4-propylbenzaldehyde,
4-t-butylbenzaldehyde,
N-methylpyrrole-2-carboxaldehyde,
pyrazine-2-carboxaldehyde,
2-chlorobenzaldehyde,
3-carbomethoxybenzaldehyde,
3-trifluoromethylbenzaldehyde, and
1-naphthylcarboxaldehyde, one obtains:

1-[3-(3-thenylidene)-1H,3H-thiazolo[3,4-a]benzimidazole-1-ylidene]urea,
1-[3-(2-pyridylidene)-1H,3H-thiazolo[3,4-a]benzimidazole-1-ylidene]urea,
1-[3-(2-methoxybenzylidene)-1H,3H-thiazolo[3,4-a]benzimidazol-1-ylidene]urea,
1-[3-(4-propylbenzylidene)-1H,3H-thiazolo[3,4-a]benzimidazol-1-ylidene]urea,
1-[3-(4-t-butylbenzylidene)-1H,3H-thiazolo[3,4-a]benzimidazol-1-ylidene]urea,
1-[3-(2-N-methylpyrrylidene)-1H,3H-thiazolo[3,4-a]benzimidazol-1-ylidene]urea,
1-[3-(2-pyrazylidene)-1H,3H-thiazolo[3,4-a]benzimidazol-1-ylidene]urea,
1-[3-(2-chlorobenzylidene)1H,3H-thiazolo[3,4-a]benzimidazol-1-ylidene]urea,
1-[3-(3-carbomethoxybenzylidene)-1H,3H-thiazolo[3,4-a]benzimidazol-1-ylidene]urea,
1-[3-(3-trifluoromethylbenzylidene)-1H,3H-thiazolo[3,4-a]benzimidazol-1-ylidene]urea, and
1-[3-(1-naphthylidene)-1H,3H-thiazolo[3,4-a]benzimidazol-1-ylidene]urea, respectively.

What is claimed is:
1. A compound of the formula

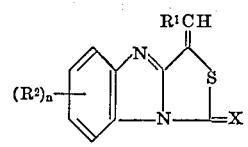

wherein R¹ is selected from the group consisting of phenyl, substituted phenyl wherein said phenyl substituent is selected from the group consisting of lower alwkyl lower alkoxy, nitro, halogen, carboxy, carbo-lower alkoxy and $CF_3$, naphthyl, and thienyl, furyl, pyridyl, pyrryl and pyrazinyl; and R² is selected from the group consisting of hydrogen, halogen, nitro, lower alkyl, lower alkoxy, amino, dilower alkylamino-lower alkyl, and phenyl; and X is selected from the group consisting of O and NCONHR³ wherein R³ is selected from the group consisting of lower alkyl, phenyl, naphthyl, phenyl lower alkyl, trichloromethylcarbonyl, and substituted phenyl wherein said phenyl substituent is as set forth above; and n is selected from the group consisting of the integers one and two.

2. The compound of claim 1 wherein X is oxygen.
3. The compounds of claim 1 wherein X is

NCONHR³.

4. The compound of claim 2 having the name 3-(2-thenylidene) - 1H,3H - thiazolo[3,4-a]benzimidazol-1-one.
5. The compound of claim 3 having the name 1-(3-benzylidene - 1H,3H - thiazolo[3,4-a]benzimidazol-1-ylidene)-3-phenylurea.
6. The compound of claim 3 having the name 1-phenyl-3-[3 - (2 - thenylidene)-1H,3H-thiazolo[3,4-a]benzimidazol-1-ylidene]urea.
7. The compound of claim 3 having the name 1-(3-furfurylidene-1H,3H - thiazolo[3,4-a]benzimidazol - 1-ylidene)-3-phenylurea.

References Cited
UNITED STATES PATENTS
3,641,019  2/1972  Trepanier et al. __ 260—248 AS
3,665,007  5/1972  Haugwitz et al. ___ 260—306.7

HENRY R. JILES, Primary Examiner
C. M. S. JAISLE, Assistant Examiner

U.S. Cl. X.R.
260—240.7, 306.7; 424—249, 263, 270

UNITED STATES PATENT OFFICE
CERTIFICATE OF CORRECTION

Patent No. 3,819,618　　　　　　　　　Dated   June 25, 1974

Inventor(s) Rudiger Dieter Haugwitz, Venkatachala Lakshmi Narayanan

It is certified that error appears in the above-identified patent and that said Letters Patent are hereby corrected as shown below:

Column 3, line 28, "amino" should read -- imino --.

Column 4, line 57, "concenration" should read -- concentration --.

Column 5, line 53, "18.79" should read -- 18.78 --.

Column 6, line 26, after "benzimidazole" insert -- for 2-chloromethylbenzimidazole --.

Column 7, line 68, "thiazole" should read -- thiazolo --.

Column 7, line 71, "thiazole" should read --thiazolo --.

Column 8, line 11, after "benzimidazol-1" insert -- -ylidene)-urea --.

Example 31, should read as follows:
　　-- 31　　　---　　　1　　$C_4H_9$　　---　　1　　$-NHC_4H_9$ --.

Column 9, line 65, "thiazole" should read -- thiazolo --.

Column 12, line 13, "alwkyl" should read -- alkyl, --.

Column 12, line 26, "compound" should read -- compounds --.

Signed and sealed this 17th day of September 1974.

(SEAL)
Attest:

McCOY M. GIBSON JR.　　　　　　　　C. MARSHALL DANN
Attesting Officer　　　　　　　　　Commissioner of Patents